US011610044B2

(12) United States Patent
Gourley et al.

(10) Patent No.: US 11,610,044 B2
(45) Date of Patent: Mar. 21, 2023

(54) DYNAMIC MANAGEMENT OF CONTENT IN AN ELECTRONIC PRESENTATION

(71) Applicant: Primer Technologies, Inc., San Francisco, CA (US)

(72) Inventors: Sean Gourley, San Francisco, CA (US); John Bohannon, San Francisco, CA (US)

(73) Assignee: Primer Technologies, Inc., San Francisco, CA (US)

( * ) Notice: Subject to any disclaimer, the term of this patent is extended or adjusted under 35 U.S.C. 154(b) by 10 days.

(21) Appl. No.: 16/426,432

(22) Filed: May 30, 2019

(65) Prior Publication Data

US 2020/0034408 A1    Jan. 30, 2020

Related U.S. Application Data

(60) Provisional application No. 62/712,137, filed on Jul. 30, 2018.

(51) Int. Cl.
  *G06F 40/103*     (2020.01)
  *G06F 3/0484*     (2022.01)
(52) U.S. Cl.
  CPC .......... *G06F 40/103* (2020.01); *G06F 3/0484* (2013.01)

(58) Field of Classification Search
  CPC ............................ G06F 40/103; G06F 3/0484
  See application file for complete search history.

(56) References Cited

U.S. PATENT DOCUMENTS

| | | | |
|---|---|---|---|
| 9,843,768 B1* | 12/2017 | Negi | H04H 60/33 |
| 2009/0210796 A1* | 8/2009 | Bhogal | G06F 16/4393 |
| | | | 715/730 |
| 2014/0282013 A1* | 9/2014 | Amijee | G06F 3/0482 |
| | | | 715/732 |
| 2016/0266864 A1* | 9/2016 | Rajendran | G06F 3/04847 |
| 2018/0295420 A1* | 10/2018 | Rumreich | H04N 21/4532 |

* cited by examiner

*Primary Examiner* — Scott T Baderman
*Assistant Examiner* — Seung Woon Jung (57) ABSTRACT

The technology disclosed herein dynamically presents content in a presentation based on physical cues received from attendees to the presentation. In a particular implementation, a method provides, after commencing a presentation comprising content items presented by a computing system in a first sequence, identifying one or more physical cues from a plurality of attendees to the presentation. The method further provides modifying the first sequence based on the physical cues to create a second sequence for which the content items will be presented and presenting the content items in the second sequence to the plurality of attendees.

20 Claims, 8 Drawing Sheets

DYNAMIC MANAGEMENT OF CONTENT IN AN ELECTRONIC PRESENTATION

RELATED APPLICATIONS

This application is related to and claims priority to U.S. Provisional Patent Application 62/712,137, titled "DYNAMIC MANAGEMENT OF CONTENT IN AN ELECTRONIC PRESENTATION," filed Jul. 30, 2018, and which is hereby incorporated by reference in its entirety.

TECHNICAL BACKGROUND

Electronic presentations can be given to one person up to an entire stadium worth of people and can cover any topic. As such, electronic presentations are used for everything from business meetings to academic lectures to keynote speeches. The presentations may include text, photos, graphics, videos, audio, or any other type of media that can be presented by a computing system or device. In many cases, the content of a presentation is organized in slides that a presenter can cycle through to guide the presentation. The content sequence for the presentation, no matter how it is organized, is static once the presentation has started. Should the presenter desire the content be presented in a different sequence, then the presenter must cycle back and forth through the content in the static sequence rather than changing the static sequence itself.

OVERVIEW

The technology disclosed herein dynamically presents content in a presentation based on physical cues received from attendees to the presentation. In a particular implementation, a method provides, after commencing a presentation comprising content items presented by a computing system in a first sequence, identifying one or more physical cues from a plurality of attendees to the presentation. The method further provides modifying the first sequence based on the physical cues to create a second sequence for which the content items will be presented and presenting the content items in the second sequence to the plurality of attendees.

In some embodiments, the physical cues indicate reactions of the plurality of attendees and the method further includes aggregating the reactions to determine an overall reaction of the plurality of attendees. In these embodiments, modifying the first sequence based on the physical cues may include modifying the first sequence based on the overall reaction.

In some embodiments, modifying the first sequence based on the physical cues includes reordering the content items to enhance engagement of the attendees with the presentation. In these embodiments, each content item may be associated with a topic of a plurality of topics and reordering the content items may include reordering the content items with respect to the plurality of topics. Also in these embodiments, each content item may have a media type of a plurality of media types and reordering the content items may include reordering the content items with respect to the plurality of media types.

In some embodiments, modifying the first sequence based on the physical cues may include deleting one or more of the plurality of content items.

In some embodiments, the content items comprise speaking notes to a presenter for the presentation and/or slides displayed to the plurality of attendees.

In another embodiment, an apparatus is provided having one or more computer readable storage media and a processing system operatively coupled with the one or more computer readable storage media. Program instructions stored on the one or more computer readable storage media, when read and executed by the processing system, direct the processing system to, after commencing a presentation comprising content items presented by a computing system in a first sequence, identify one or more physical cues from a plurality of attendees to the presentation. The program instructions further direct the processing system to modify the first sequence based on the physical cues to create a second sequence for which the content items will be presented and present the content items in the second sequence to the plurality of attendees.

DETAILED DESCRIPTION

Electronic presentations are used widely across many different fields. An electronic presentation may be used in a business meeting presentation between two or more people, in a small classroom presentation to a class of students, in a large auditorium for a keynote presentation at a conference, or in some other type of situation where information augmenting a presenter's presentation capabilities is desired. An electronic presentation uses a computing system and some type of user interface (e.g., a display screen/projector for visual content and/or one or more speakers for audio content) to present the information augmenting what is being said by one or more presenters. A very common format for an electronic presentation is a slide presentation whereby text, image, video, and/or audio content is organized into slides that can be cycled through by the presenter as the corresponding presentation progresses.

An electronic presentation is prepared prior to the start of a presentation associated therewith. When a presenter cycles through the presentation, the only way a presenter can reorder content in the presentation is to cycle forward and backwards through the electronic presentation's predefined sequence of content. The presenter does not have the option to reorder that predefined sequence and, even if the presenter could reorder the predefined sequence, the presenter may not be aware that a reordering would beneficial to the attendees of the presentation.

Figure 1:
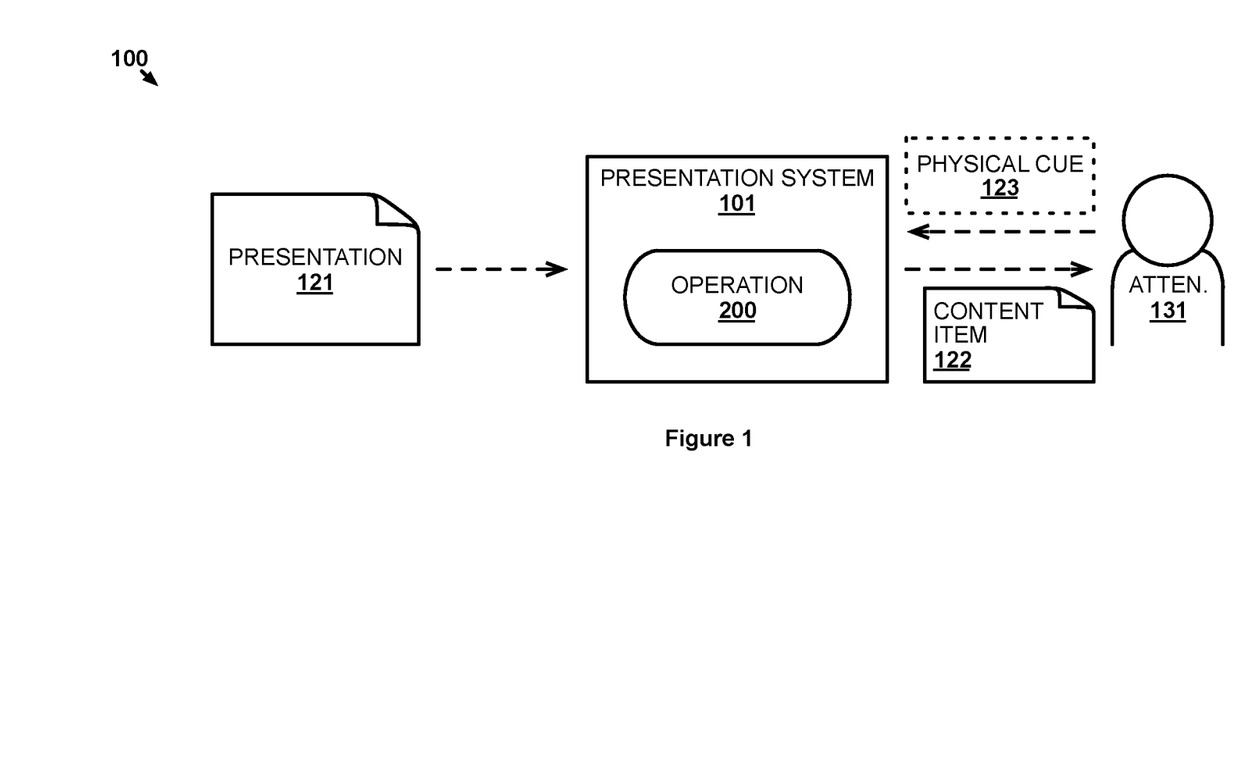
FIG. 1 illustrates a computing environment for dynamically managing content in a presentation.

FIG. 1 illustrates computing environment 100 for dynamically managing content in a presentation. Computing environment 100 includes presentation system 101, which presents content items 122 of electronic presentation 121 to one or more attendees 131. In operation, presentation system 101 may present respective visual and audible ones of content items 122 on display and/or audio components built into presentation system 101. Alternatively, presentation system 101 may be coupled to one or more display and/or audio components for presenting content items 122. For example, presentation system 101 may be a computer with a built-in display and built-in speakers but may also present content items 122 over an external television, external projector display, and/or external speakers for audio. Similarly, presentation system 101 may include components necessary to capture physical cue 123 from attendees 131, such as a built in camera and/or microphone, or may receive physical cue 123 captured by external components, such as one or more external video cameras and/or microphones.

Electronic presentation 121 is provided to presentation system 101 for presentation. Electronic presentation 121 may have been created on presentation system 101, may be transferred to presentation system 101 over a network, may be loaded onto presentation system 101 from removable media (e.g., optical disk, removable flash memory, etc.), or may be provided to presentation system 101 in some other manner. Content items 122 have a sequence for presentation that is predefined before electronic presentation 121 commences. presentation system 101 performs operation 200 to modify that predefined sequence automatically even after the electronic presentation 121 commences.

Figure 2:
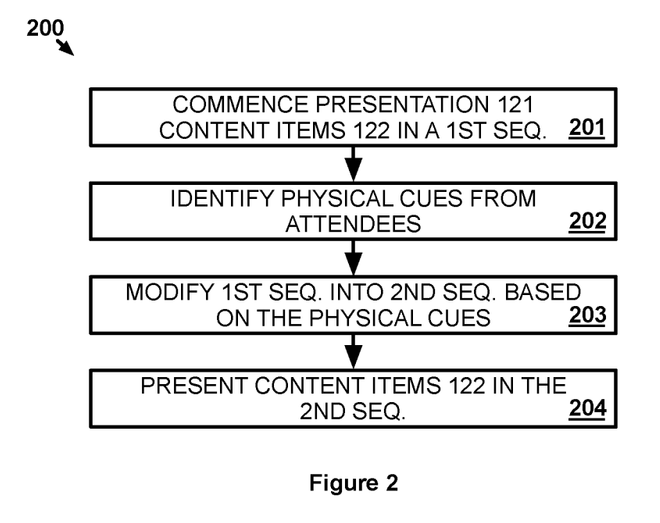
FIG. 2 illustrates an operation of the computing environment to dynamically manage content in a presentation.

FIG. 2 illustrates operation 200 of computing environment 100 to dynamically manage content in a presentation. In operation 200, presentation system 101 commences presentation of electronic presentation 121 by presenting the first of content items 122 in the predefined sequence (201). A presenter, who may be considered one of attendees 131, may provide user input to presentation system 101 indicating that electronic presentation 121 should commence, presentation system 101 may be scheduled to commence at a defined time, or some other trigger may result in the commencement of electronic presentation 121.

After commencing electronic presentation 121, presentation system 101 identifies one or more physical cues 123 from attendees 131 (202). Each of physical cues 123 may be a facial expression/movement, a body position/movement, biometric information (e.g., heart rate, blood pressure, etc.), or some other factor produced by the body of one of attendees 131—including combinations thereof. Various sensors, such as photo, video, audio, heart rate, 3D mapping, etc., may be included in presentation system 101 or otherwise accessible by presentation system 101 (e.g., connected to presentation system 101 over a peripheral or network interface) to capture the physical cues that are identified by presentation system 101. Such physical cues may indicate a reaction of one of attendees 131 to whichever of content items 122 is being presented to the attendee when the physical cue is detected. The physical cue may indicate that the attendee may be happy, sad, angry, confused, bored, or feeling some other type of emotion in reaction to the content item being presented. Multiple physical cues from a single attendee may be detected during presentation of a single content item. In some cases, presentation system 101 may be able to correlate a physical cue to a specific portion of the content item currently being viewed by the attendee when the physical cue occurred. For example, presentation system 101 may use gaze detection on visual content items such as a document, video, or photo to determine where an attendee was looking or may register the current timestamp of a video or audio content item being played. Presentation system 101 may capture physical cues 123 from all of attendees 131 or may consider physical cues 123 from only a subset of attendees 131.

Presentation system 101 then modifies the sequence of electronic presentation 121 based on physical cues 123 to create a second sequence for which content items 122 will be presented (203). The second sequence may change the content item of content items 122 that presentation system 101 presents to attendees 131 after the content item currently being presented. As mentioned above, the physical cue may indicate a reaction that attendees 131 are having to the currently presented content. Attendees 131 may aggregate the reactions indicated by physical cues 123 to determine an overall reaction of attendees 131 as a group. For example, presentation system 101 may determine an average reaction of the entire group. In some cases, presentation system 101 may weigh the reaction of select attendees (e.g., ones of attendees 131 that a presenter has designated as being more important) more heavily when determining a reaction of attendees 131 as a whole. Presentation system 101 may refer to instructions for how to re-sequence content items 122 depending on what reaction is determined. These instructions may be a default set of instructions, may be provided, at least in part, by a presenter, or may be provided to presentation system 101 in some other manner.

The instructions may indicate that, upon detecting a positive reaction to a content item, similar content items should be in sequence after the currently presented content item to evoke more positive reactions by attendees 131. Alternatively, upon detecting a negative reaction to a content item (e.g., anger or sadness), the instructions may indicate that different content items should be in sequence after the currently presented content item to evoke an opposite reaction. If available, a content item on the same or similar topic may be presented for continuity of topic to evoke the desired reaction or presentation system 101 may be on an unrelated topic. In another example, presentation system 101 may determine that attendees 131 have a confused reaction to the currently presented content. The instructions may indicate that presentation system 101 should identify a content item that would explain the currently presented content and place that content item next in sequence for presentation after the currently presented content. In some examples, a content item, such as the explanatory content item in the previous example, may have been included electronic presentation 121 but not included in the original sequence. This allows presentation system 101 to place the content item in sequence only if presentation system 101 determines it is needed based on the reaction of attendees 131.

Also, as noted above, multiple physical cues may be identified from each attendee during the presentation of a single content item. Those multiple physical cues may be combined to indicate a single reaction or may represent multiple reactions to various portions of a single content item. In the latter cases, the instructions may include instructions for how to handle situations where multiple reactions occurred. For example, the instructions may indicate that presentation system 101 should handle re-sequencing in accordance with the most prominent reaction or in accordance with the last captured reaction.

Once the sequence has been modified into the second sequence, presentation system 101 presents content items 122 to attendees 131 in the second sequence (204). Thus, rather than content items subsequent to the currently presented content item being presented in the original sequence, presentation system 101 employed physical cues 123 of attendees 131 to provide a sequence more tailored to the experience of attendees 131 during electronic presentation 121. As further content items of content items 122 are presented to attendees 131, presentation system 101 may continue to identify physical cues 123 from attendees 131 and re-sequence the ones of content items 122 yet to be presented to attendees 131 in accordance with operation 200.

Figure 3:
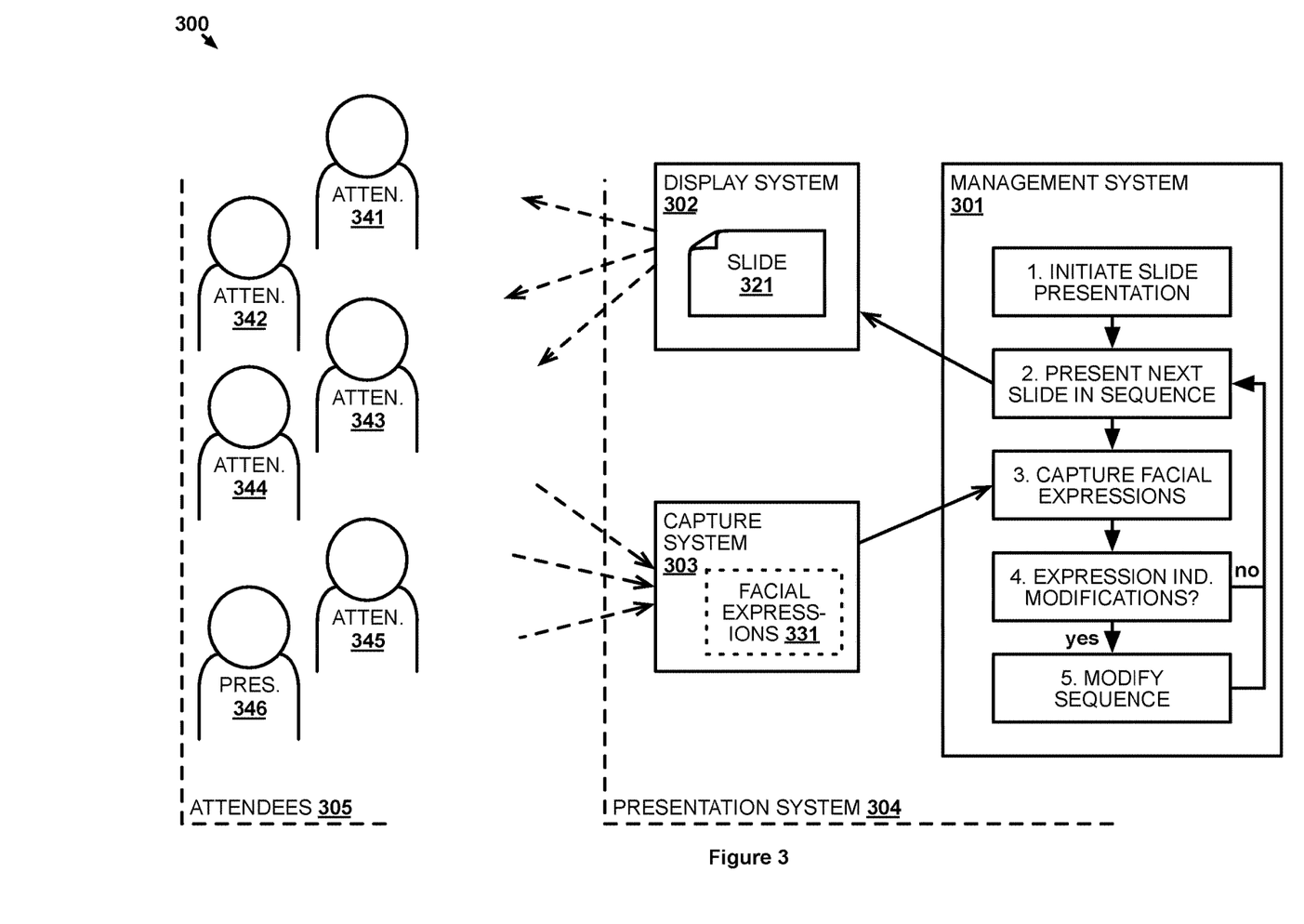
FIG. 3 illustrates another computing environment for dynamically managing content in a presentation.

FIG. 3 illustrates computing environment 300 for dynamically managing content in a presentation. Computing environment 300 includes management system 301, display system 302, and capture system 303. Collectively, management system 301, display system 302, and capture system 303 comprise presentation system 304. All or a portion of display system 302 may be incorporated into management system 301. Likewise, all or a portion of capture system 303 may be incorporated into management system 301. Portions of display system 302 and capture system 303 that are located external to management system 301 may be connected to management system 301 over a communication network or may be directly connected to management system 301 via a wired or wireless video, audio, or data connection (e.g., Bluetooth).

In operation, presentation system 304 presents an electronic presentation formatted into slides to attendees 305. In this example, presenter 346 is considered an attendee along with attendee 341, attendee 342, attendee 343, attendee 344, and attendee 345, although presenter 346 may not be considered an attendee in other examples. While this example only includes a single presenter, it should be understood that multiple presenters may be involved with presenting a single electronic presentation. Given the number of attendees 305, presentation system 304 may be located in a conference room with attendees 305, although other types of locations may be used. In that example, management system 301 may be a laptop of presenter 346 and display system 302 may include a television display in the conference room connected to the laptop. The built-in display of the laptop may also be part of display system 302. A conference room camera may be connected to the laptop to make up at least a portion of capture system 303. In some examples, one or more of attendees 305 may be remote attendees. In such cases, portions of display system 302 and capture system 303 may be co-located with each of the remote attendees. For example, if attendee 341 is attending remotely via their personal computer workstation, then that workstation may be considered a portion of display system 302 (e.g., a display coupled to the workstation) and capture system 303 (e.g., a camera coupled to the workstation).

Management system 301 initiates an electronic presentation at step 1 responsive to a instruction from presenter 346. For example, presenter 346 may select a graphical element of a user interface of management system 301 to indicate that the electronic presentation should commence. In this example, the electronic presentation is a slide presentation and the content items in the electronic presentation therefore comprise slides. Each slide may include one or more types of content, such as text, photo, graphic, video, audio, or other type of audible or visual media—including combinations thereof.

In response to initiating the electronic presentation, management system 301 displays a first slide for presentation as slide 321 at step 2 to attendees 305 via display system 302 because the first slide is the next slide in the original sequence. In this example, should slide 321 include audible content, display system 302 also includes components (e.g., speakers) necessary to present the audible content to attendees 305. During presentation of slide 321, capture system 303 captures physical cues, facial expressions in this example, at step 4 from attendees 305 for processing by management system 301. For example, a camera of capture system 303 facing attendees 305 may capture video at least one of attendees 305 so that management system 301 can process the video to determine the facial expressions of attendees 305 when being presented with slide 321.

Management system 301 then determines at step 4 whether the facial expressions captured from attendees 305 indicate that the sequence for presenting the slide presentation should be modified. That is, management system 301 determines what characteristics the next slide in the sequence should have and, if the next slide in the sequence has those characteristics, then no modification is needed to the sequence. Characteristics of a slide may include the type of content in the slide (e.g., text, video, audio, etc.), the length of the content (e.g., the amount of words or estimated length of time needed to present the content), the topic of the content, the tone of the content (e.g., funny, serious, sad, etc.), or some other characteristic that might influence what reaction a user may have to the content item.

If no modification is necessary, then management system 301 returns to step 2 to present the next slide in the sequence as slide 321 once presenter 346 is finished presenting the current slide 321. Presenter 346 may indicate that they are ready to move onto the next slide by providing input to management system 301 instructing management system 301 to start presenting the next slide.

However, if a modification is necessary, management system 301 modifies the sequence of the slid presentation at step 6 such that the slide in the sequence has the desired characteristics. In some examples, management system 301 may modify more than just which slide comes next in the sequence to potentially reduce the number of times the sequence will need to be modified in the future. After modifications have been made, management system 301 returns to step 2 to present the next slide in the sequence as slide 321 once presenter 346 is finished presenting the current slide 321. The next slide in this case is different from the next slide would have been if no modifications were made. In some examples, rather than modifying the immediately subsequent slide in the sequence, management system 301 may determine that the next slide is fine as is (e.g., management system 301 may determine to finish presenting the slides covering the current topic) and modify the sequence further down the line.

Management system 301 will then repeat steps 3-6 until all of the slides in the slide presentation have been presented. In some examples, one or more slides originally included in the slide presentation may be removed from the presentation during sequence modification. For instance, if management system 301 determines that facial expressions 331 indicate that facial expressions 331 understand a topic already, slides covering background information on the topic may be removed from the presentation.

Figure 4:
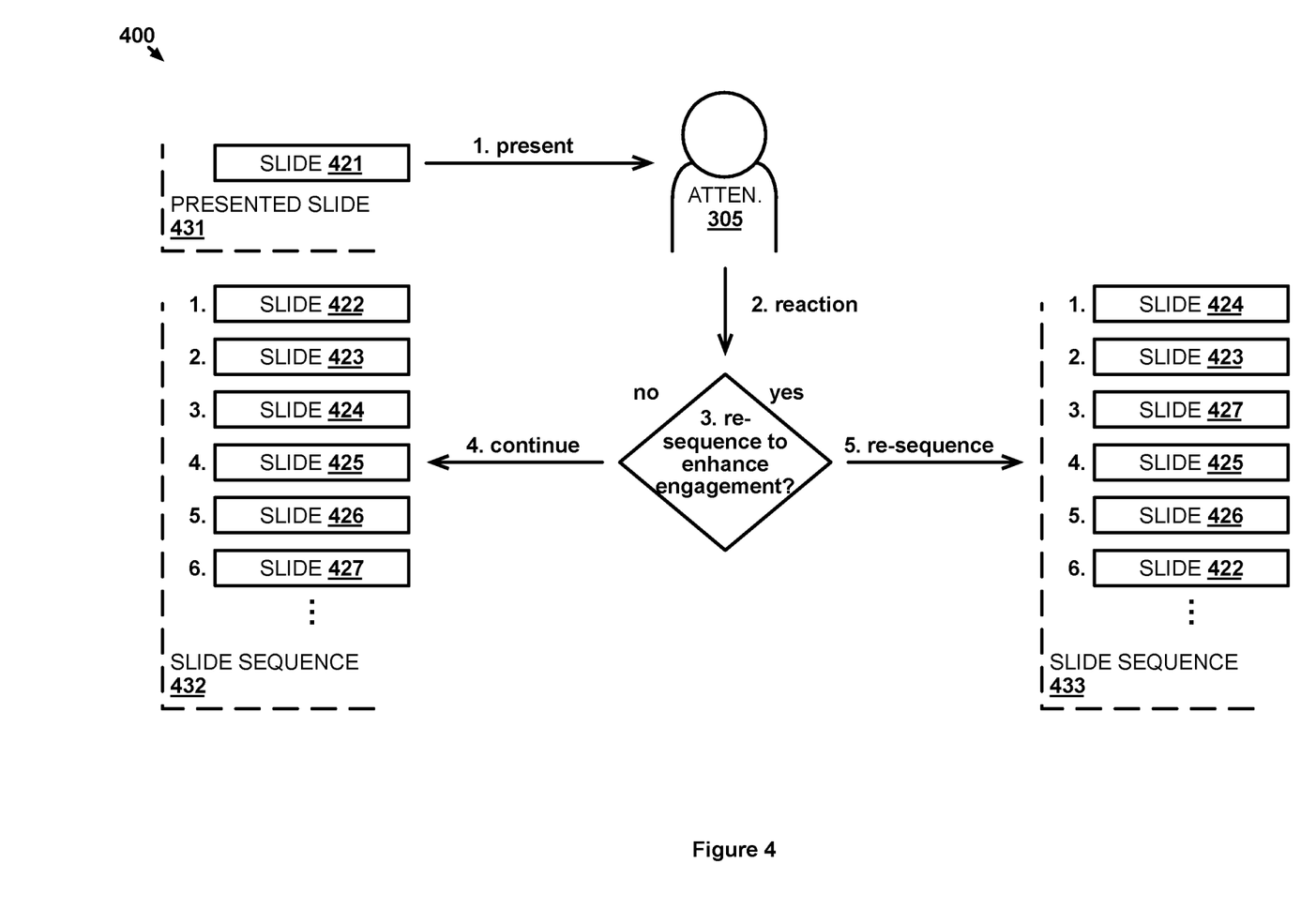
FIG. 4 illustrates an operational scenario for dynamically managing content in a presentation.

FIG. 4 illustrates operational scenario 400 for dynamically managing content in a presentation. Computing environment 300 describes how a slide presentation may be modified by management system 301. Specifically, in operational scenario 400 slide 421 is currently being presented at step 1 to attendees 305. Slide sequence 432 represents the current sequence of the remaining slides in the slide presentation. According to slide sequence 432, slide 421 is going to be followed for presentation by slide 422, then slide 423, slide 424, etc. Only slides 422-427 are shown in slide sequence 432 but slide sequence 432 may include more, or fewer, slides than slides 422-427.

During presentation of slide 421, management system 301 processes facial expressions 331 to determine a reaction of attendees 305 at step 2 to slide 321. The reaction of attendees 305 is used as a basis for management system 301 to determine at step 3 whether currently presented slide 431 should be resequenced. In this example, management system 301 is instructed to ensure attendees 305 are engaged in the presentation (e.g., whether they are likely to remain focused on the presentation, ask questions, etc.), although other examples may include different goals for management system 301. Certain reactions of attendees 305 may indicate that attendees 305 are likely not engaged with the presentation, such as boredom, tiredness, in-attention, etc., which may be indicated by facial expressions 331 that lack eye contact, include yawns, indicate talking with a neighbor, etc. Similarly, the lack of reactions indicating that attendees 305 are engaged may indicate attendees 305 are not engaged with the presentation, such as reactions indicated by facial expressions 331 that include good eye contact, no talking, smiles, etc. In some examples, management system 301 may need a certain threshold percentage or number of attendees 305 to have a non-engaged reaction before management system 301 will determine that slide sequence 432 that attendees 305 as a whole lack engagement.

Once management system 301 determines whether attendees 305 are adequately engaged with the presentation, management system 301 analyzes slide sequence 432 to determine whether the next slides in slide sequence 432 have the necessary characteristics to maintain or enhance engagement. For example, management system 301 may learn from previously presented slides which slide characteristics have elicited engaged reactions either historically from other slide presentations or the current slide presentation. If slide sequence 432 is determined to be sufficient for engaging attendees 305, then management system 301 continues using slide sequence 432. Slide 422 will be presented by management system 301 after slide 421 and followed in order by slides 423-427.

However, if management system 301 determines that slide sequence 432 is not sufficient to enhance engagement, then management system 301 modifies slide sequence 432 at step 5 to create slide sequence 433. In this example, slide 424 is moved up to position 1 followed by slide 423. Slide 427 is moved up to position 3, followed by slide 425, slide 426, and slide 422, which was moved down to position 6. In this example, management system 301 determined that the characteristics of slides 424 and 427 warranted those slides being moved up in slide sequence 433. For example, attendees 305 may have non-engaged reactions to slide 421 and slide 422 may have similar characteristics (e.g., text only content). In contrast, slide 424 may have different characteristics (e.g., video content) that are known to increase engagement (e.g., characteristics learned by management system 301 or characteristics indicated to management system 301 by a user). Thus, slide 424 is moved up to the next position in slide sequence 433 in an attempt to enhance the engagement of attendees 305 in the slide presentation.

Figure 5:
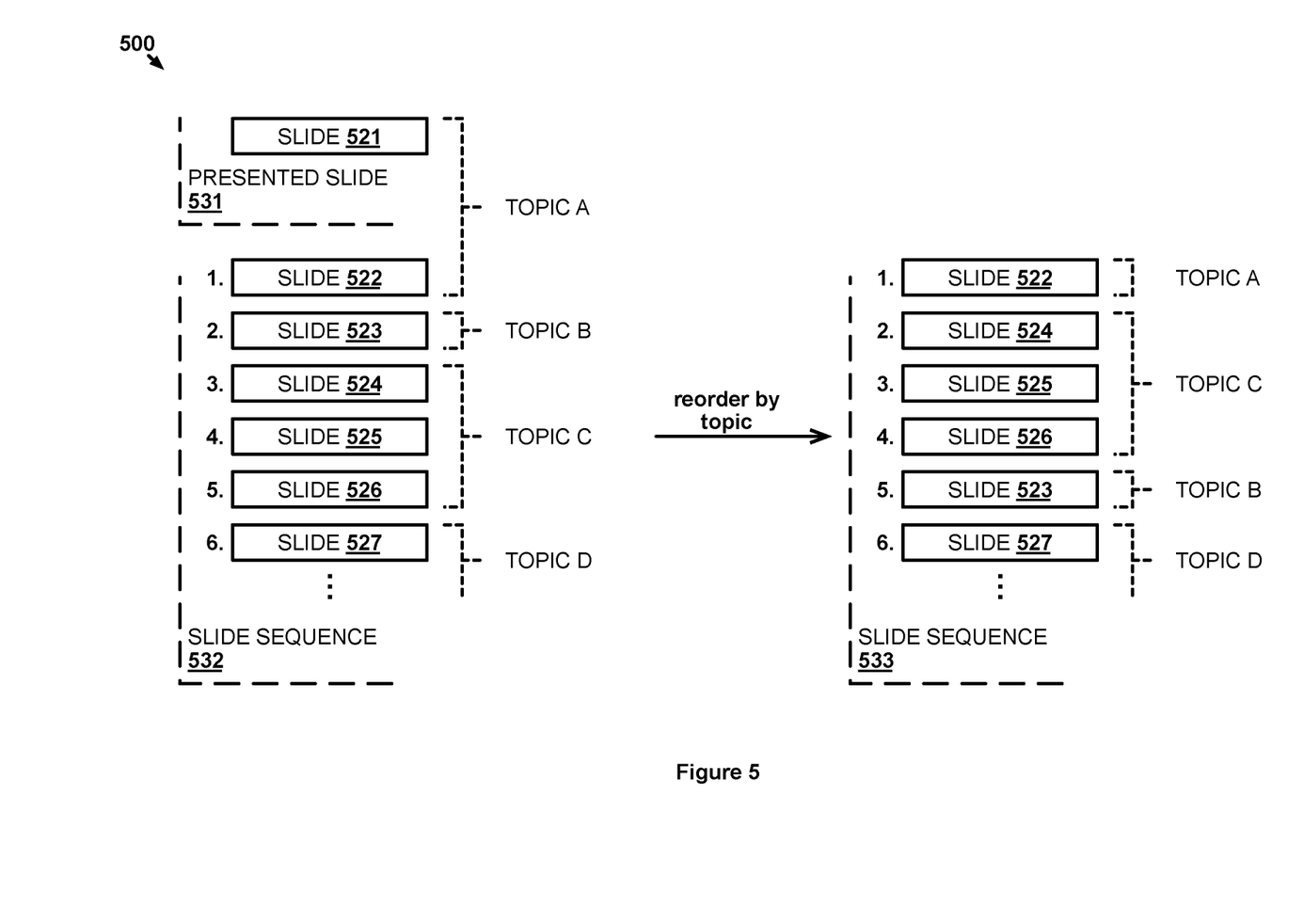
FIG. 5 illustrates another operational scenario for dynamically managing content in a presentation.

FIG. 5 illustrates operational scenario 500 for dynamically managing content in a presentation. Operational scenario 500 represents another manner in which management system 301 may modify a slide sequence once it is determined that modification should be performed. In this example, slide sequence 532 is modified based on a topic covered by the respective slides in the slide presentation. Slide 521, which is currently presented slide 531, and slide 522 cover topic A, slide 523 covers topic B, slides 524-526 cover topic C, and at least slide 527 covers topic D. When management system 301 determines that slide sequence 532 is not sufficient to maintain or enhance engagement of attendees 305, management system 301 reorders the slides therein on a topical basis. In this example, management system 301 determines that topic C is more likely than topic B to maintain or enhance engagement. Therefore, slides 524-526 of topic C are moved ahead of slide 523 of topic B in slide sequence 533.

In this example, slide 522 remains at position 1 in slide sequence 533 so that management system 301 can complete presentation of slides in topic A after slide 521 has been presented. In other examples, management system 301 may determine that the transition to topic C should happen more quickly and remove slide 522 or move it further down slide sequence 533.

Figure 6:
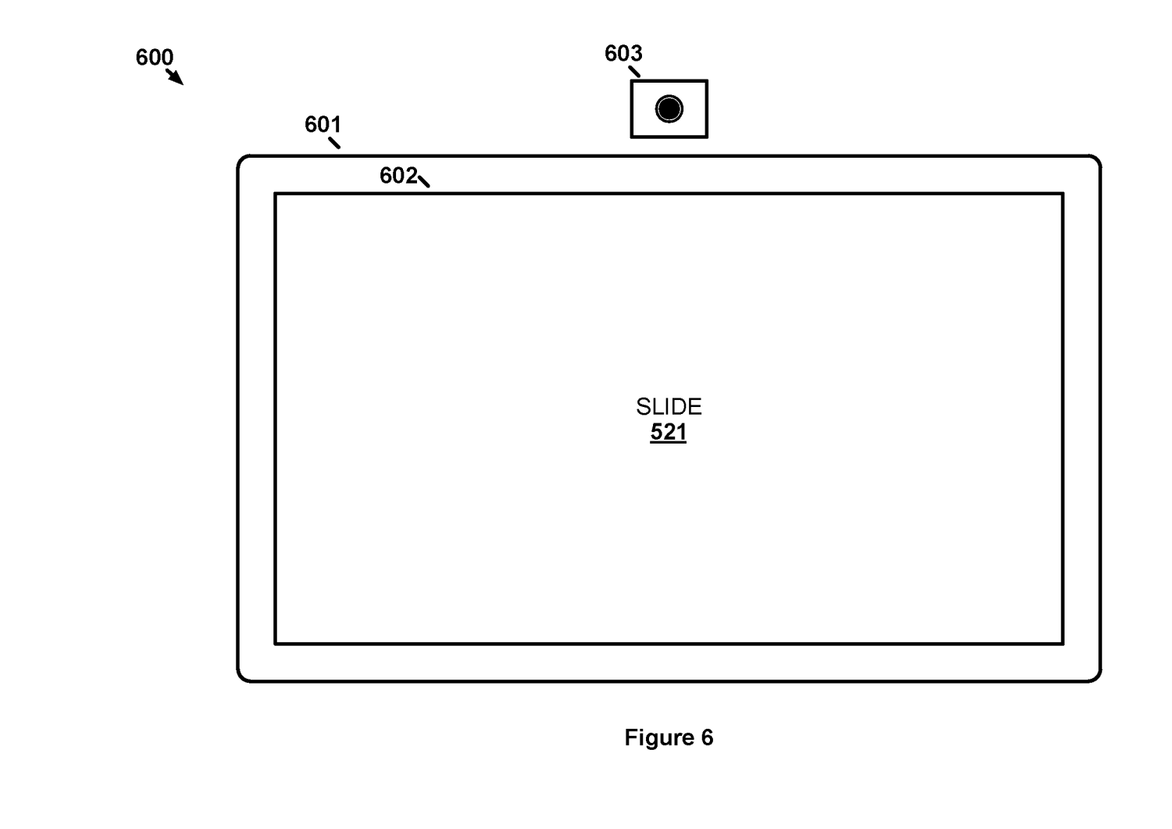
FIG. 6 illustrates a display/capture system for dynamically managing content in a presentation.

FIG. 6 illustrates display/capture system 600 for dynamically managing content in a presentation. Display/capture system 600 includes display 601 and camera 603. Display 601 is an example of a display that may be included in display system 302. Display 601 may be a television or other type of monitor capable of displaying images from a computing system, such as management system 301. Camera 603 comprises a camera capable of capturing images, still and video, and transferring those images to a computing system, such as management system 301. Camera 603 is an example of a capture component in capture system 303. In some examples, camera 603 may be incorporated into display 601. Likewise, in some examples, display 601 may be incorporated into a computing system, such as management system 301 or a computing system in communication with management system 301.

In this example, the display 601 displays slide 521 from operational scenario 500 in slide window 602. Slide window 602 may use the entirety of display 601's screen or may use only a portion of the screen. When presenter 346 instructs management system 301 to proceed to the next slide, slide window 602 will display the next slide in sequence, which is slide 522 in accordance with both slide sequence 532 and slide sequence 533 of operational scenario 500. While displaying slide 521, and any subsequent slides, camera 603 captures images or video of any of attendees 305 that are within view of camera 603. Those images or video are transferred to management system 301 for processing to identify physical cues for attendees 305 captured therein.

Figure 7:
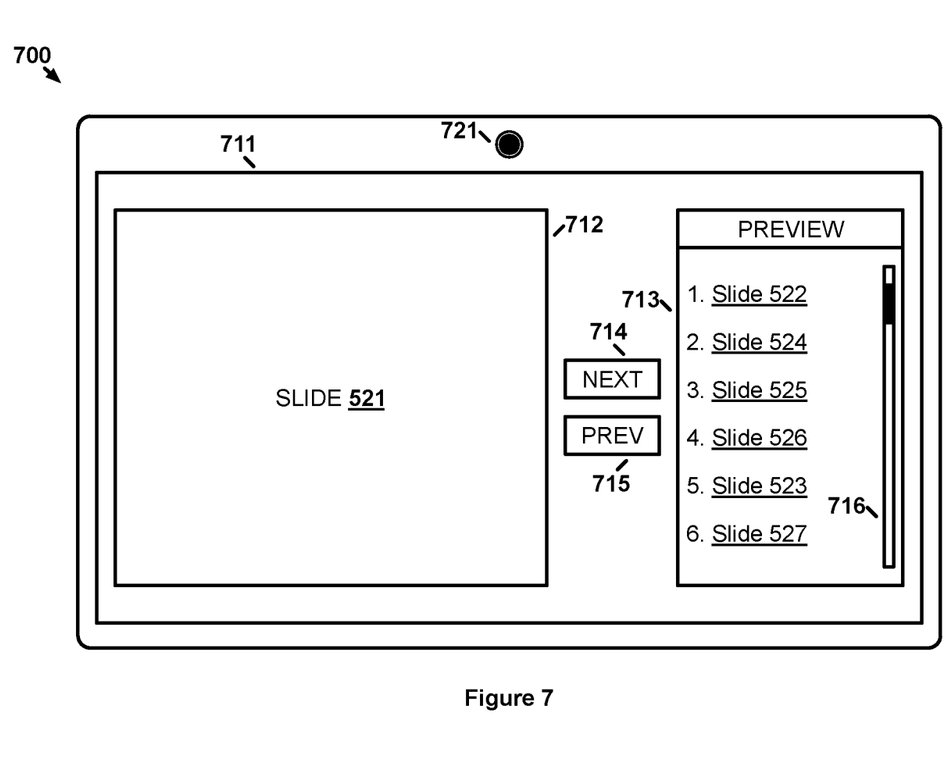
FIG. 7 illustrates another display/capture system for dynamically managing content in a presentation.

FIG. 7 illustrates display/capture system 700 for dynamically managing content in a presentation. Display/capture system 700 is an example of what presenter 346 may use during a slide presentation. Display 711 is another example of a display that may be included in display system 302. In one example, display 711 may be a laptop or tablet computer display of presenter 346. Display/capture system 700 includes a built-in camera 721, which is an example capture component of capture system 303. In some examples, camera 721 may be an external component. In other examples, physical cues of presenter 346 may not be captured along with physical cues of other attendees. In those examples, camera 721 may not be necessary.

Like display/capture system 600, display/capture system 700 includes display 711 displaying slide 521 from operational scenario 500 in slide window 712. By displaying the current slide to presenter 346, presenter 346 can reference the content in the current slide without having to view another display, such as display 601. Presenter 346 may select next slide button 714 and previous slide button 715 to cycle between next and previous slides, respectively. Presentation preview window 713 provides presenter 346 with speaking notes, which include the current sequence of the slide presentation, which is slide sequence 533 in this example. Presenter 346 may use scroll bar 716 to scroll though slides beyond position 6 in slide sequence 533. Providing presenter 346 with a preview of slide sequence 533 ensures that presenter 346 is aware of modifications to the slide sequence so as not to be caught off guard. In some examples, slides in different positions than they were previously may be highlighted for ease of reference. Likewise, while slide sequence 533 is shown in presentation preview window 713 as slide numbers, it should be understood that presentation preview window 713 may present the titles of the respective slides, and possibly the type of content (e.g., video, document, etc.), to give presenter 346 an even better idea of what slides are upcoming.

Figure 8:
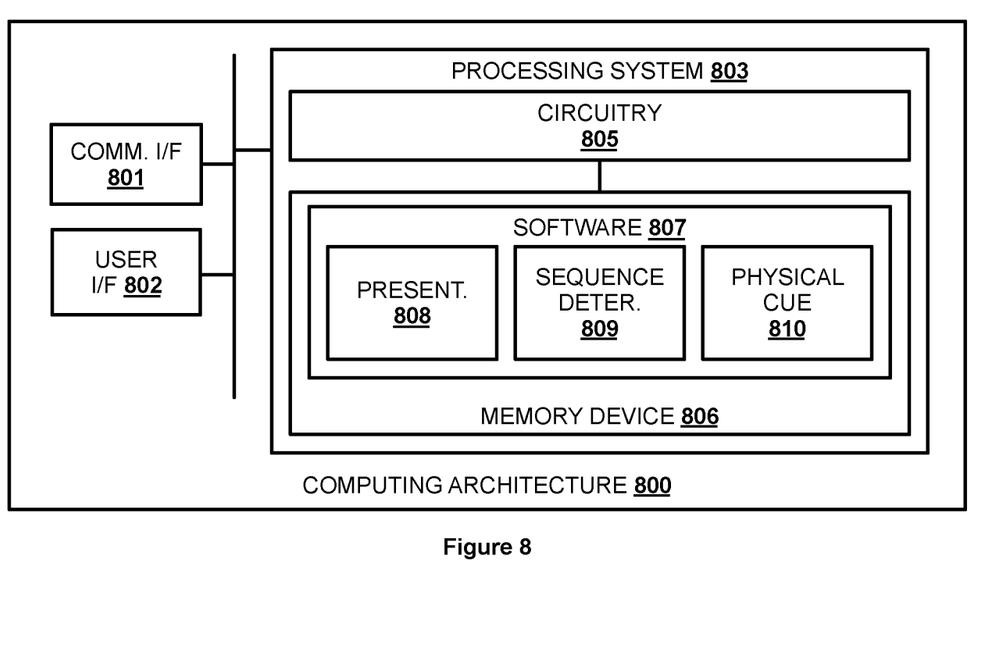
FIG. 8 illustrates a computing architecture for dynamically managing content in a presentation.

FIG. 8 illustrates computing architecture 800 for dynamically managing content presentation. Computing architecture 800 is representative of any computing system or systems with which the various operational architectures, processes, scenarios, and sequences disclosed herein for an event summary service may be implemented. Computing architecture 800 is an example of presentation systems 101 and 301, although other examples may exist. Computing architecture 800 comprises communication interface 801, user interface 802, and processing system 803. Processing system 803 is linked to communication interface 801 and user interface 802. Processing system 803 includes processing circuitry 805 and memory device 806 that stores operating software 807. Computing architecture 800 may include other well-known components such as a battery and enclosure that are not shown for clarity.

Communication interface 801 comprises components that communicate over communication links, such as network cards, ports, radio frequency (RF), processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof. In some implementations, communication interface 801 may be configured to communicate with information and supplemental resources to obtain objects for defining events. Communication interface 801 may further be configured to communicate with client or console devices of end users, wherein the users may request and receive summaries from computing system User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples. In some implementations, user interface 802 may be used in obtaining user summary requests and providing the summary to the requesting user.

Processing circuitry 805 comprises microprocessor and other circuitry that retrieves and executes operating software 807 from memory device 806. Memory device 806 may include volatile and nonvolatile, removable and non-removable media implemented in any method or technology for storage of information, such as computer readable instructions, data structures, program modules, or other data. Memory device 806 may be implemented as a single storage device, but may also be implemented across multiple storage devices or sub-systems. Memory device 806 may comprise additional elements, such as a controller to read operating software 807. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 805 is typically mounted on a circuit board that may also hold memory device 806 and portions of communication interface 801 and user interface 802. Operating software 807 comprises computer programs, firmware, or some other form of machine-readable program instructions. Operating software 807 includes presentation module 808, sequence determination module 809, and physical cue module 810, although any number of software modules may provide the same operation. Operating software 807 may further include an operating system, utilities, drivers, network interfaces, applications, or some other type of software. When executed by processing circuitry 805, operating software 807 directs processing system 803 to operate computing architecture 800 as described herein.

In one implementation, physical cue module 810 directs processing system 803 to, after commencing a presentation comprising content items presented by a computing system in a first sequence, identify one or more physical cues from a plurality of attendees to the presentation. Sequence determination module 809 directs processing system 803 to modify the first sequence based on the physical cues to create a second sequence for which the content items will be presented. Presentation module 808 directs processing system to present the content items in the second sequence to the plurality of attendees.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for dynamically modifying an ongoing electronic presentation, the method comprising:
    after commencing an electronic presentation comprising content items for presentation by a computing system in a first sequence, identifying one or more physical cues from a plurality of attendees to the electronic presentation;
    determining the one or more physical cues indicate a lack of engagement for at least a portion of the plurality of attendees with the electronic presentation;
    in response to the lack of engagement, identifying a subset of one or more of the content items that have yet to be presented, wherein the one or more content items in the subset each include one or more characteristics of previously presented content items that elicited engaged reactions in the plurality of attendees as indicated by previous physical cues captured during presentation of the previously presented content items, wherein the one or more characteristics include a media type of a plurality of media types;

modifying the first sequence based on the physical cues to create a second sequence for which the content items will be presented, wherein modifying the first sequence includes reordering the content items such that the subset is presented sooner when presenting in the second sequence than in the first sequence; and presenting the content items in the second sequence to the plurality of attendees.

2. The method of claim 1, wherein the physical cues indicate reactions of the plurality of attendees and the method further comprises:

aggregating the reactions to determine an overall reaction of the plurality of attendees.

3. The method of claim 2, wherein modifying the first sequence based on the physical cues comprises:

modifying the first sequence based on the overall reaction.

4. The method of claim 1, wherein determining the one or more physical cues indicate a lack of engagement comprises:

determining that less than a threshold number of the plurality of attendees had reactions to the electronic presentation indicating engagement with the electronic presentation.

5. The method of claim 1, wherein the one or more characteristics include a topic of the subset.

6. The method of claim 1, wherein the media type comprises a photo.

7. The method of claim 1, wherein modifying the first sequence based on the physical cues comprises:

deleting one or more of the content items.

8. The method of claim 1 wherein the content items comprise speaking notes to a presenter for the electronic presentation.

9. The method of claim 1 wherein the content items comprise slides displayed to the plurality of attendees.

10. An apparatus for dynamically modifying an ongoing electronic presentation, the apparatus comprising:

one or more computer readable storage media;

a processing system operatively coupled with the one or more computer readable storage media; and program instructions stored on the one or more computer readable storage media that, when read and executed by the processing system, direct the processing system to:

after commencing an electronic presentation comprising content items for presentation by a computing system in a first sequence, identify one or more physical cues from a plurality of attendees to the electronic presentation;

determine the one or more physical cues indicate a lack of engagement for at least a portion of the plurality of attendees with the electronic presentation;

in response to the lack of engagement, identify a subset of one or more of the content items that have yet to be presented, wherein the one or more content items in the subset each include one or more characteristics of previously presented content items that elicited engaged reactions in the plurality of attendees as indicated by previous physical cues captured during presentation of the previously presented content items, wherein the one or more characteristics include a media type of a plurality of media types;

modify the first sequence based on the physical cues to create a second sequence for which the content items will be presented, wherein modifying the first sequence includes reordering the content items such that the subset is presented sooner when presenting in the second sequence than in the first sequence; and present the content items in the second sequence to the plurality of attendees.

11. The apparatus of claim 10, wherein the physical cues indicate reactions of the plurality of attendees and the program instructions further direct the processing system to:

aggregate the reactions to determine an overall reaction of the plurality of attendees.

12. The apparatus of claim 11, wherein to modify the first sequence based on the physical cues, the program instructions direct the processing system to:

modify the first sequence based on the overall reaction.

13. The apparatus of claim 10, wherein to determine the one or more physical cues indicate a lack of engagement, the program instructions direct the processing system to:

determine that less than a threshold number of the plurality of attendees had reactions to the electronic presentation indicating engagement with the electronic presentation.

14. The apparatus of claim 10, wherein the one or more characteristics include a topic of the subset.

15. The apparatus of claim 10, wherein the media type comprises a photo.

16. The apparatus of claim 10, wherein to modify the first sequence based on the physical cues, the program instructions direct the processing system to:

delete one or more of the content items.

17. The apparatus of claim 10, wherein the content items comprise speaking notes to a presenter for the electronic presentation.

18. The apparatus of claim 10 wherein the content items comprise slides displayed to the plurality of attendees.

19. One or more non-transitory computer readable storage media having program instructions stored thereon for dynamically modifying an ongoing electronic presentation, the program instructions, when read and executed by a processing system, direct the processing system to:

after commencing an electronic presentation comprising content items for presentation by a computing system in a first sequence, identify one or more physical cues from a plurality of attendees to the electronic presentation;

determine the one or more physical cues indicate a lack of engagement for at least a portion of the plurality of attendees with the electronic presentation;

in response to the lack of engagement, identify a subset of one or more of the content items that have yet to be presented, wherein the one or more content items in the subset each include one or more characteristics of previously presented content items that elicited engaged reactions in the plurality of attendees as indicated by previous physical cues captured during presentation of the previously presented content items, wherein the one or more characteristics include a media type of a plurality of media types;

modify the first sequence based on the physical cues to create a second sequence for which the content items will be presented, wherein modifying the first sequence includes reordering the content items such that the subset is presented sooner when presenting in the second sequence than in the first sequence; and present the content items in the second sequence to the plurality of attendees.

20. The one or more non-transitory computer readable storage media of claim 19, wherein the physical cues indicate reactions of the plurality of attendees and the program instructions further direct the processing system to:

aggregate the reactions to determine an overall reaction of the plurality of attendees; and
modify the first sequence based on the overall reaction.

\* \* \* \* \*